(12) United States Patent
Lim et al.

(10) Patent No.: US 7,522,782 B2
(45) Date of Patent: Apr. 21, 2009

(54) DIGITAL IMAGE DENOISING

(75) Inventors: Suk Hwan Lim, San Mateo, CA (US); D. Amnon Silverstein, Mountain View, CA (US); Niranjan Damera-Venkata, Mountain View, CA (US); Ron Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 587 days.

(21) Appl. No.: 11/099,794

(22) Filed: Apr. 6, 2005

(65) Prior Publication Data

US 2006/0226337 A1    Oct. 12, 2006

(51) Int. Cl.
*G06K 9/40* (2006.01)
*G06K 9/00* (2006.01)
*H01L 27/00* (2006.01)

(52) U.S. Cl. .................. 382/275; 250/208.1; 382/167
(58) Field of Classification Search .......... 254/255–275
See application file for complete search history.

(56) References Cited

U.S. PATENT DOCUMENTS

| | | | |
|---|---|---|---|
| 5,974,194 A * | 10/1999 | Hirani et al. ................ 382/262 |
| 6,028,955 A * | 2/2000 | Cohen et al. ................ 382/154 |
| 6,081,617 A * | 6/2000 | Bangham et al. ............ 382/173 |
| 6,404,918 B1 | 6/2002 | Hel-Or et al. |
| 6,614,930 B1 * | 9/2003 | Agnihotri et al. ........... 382/176 |
| 6,618,503 B2 | 9/2003 | Hel-Or et al. |
| 6,665,439 B1 * | 12/2003 | Takahashi .................... 382/199 |
| 7,084,906 B2 * | 8/2006 | Adams et al. ............ 348/222.1 |
| 2004/0070677 A1 * | 4/2004 | Adams et al. ............ 348/222.1 |
| 2004/0081355 A1 * | 4/2004 | Takahashi .................... 382/165 |
| 2004/0081357 A1 * | 4/2004 | Oldcorn et al. ............. 382/166 |
| 2004/0190023 A1 * | 9/2004 | Aoyama ...................... 358/1.9 |
| 2005/0111751 A1 * | 5/2005 | Avinash ....................... 382/275 |
| 2006/0226337 A1 * | 10/2006 | Lim et al. ................. 250/208.1 |

OTHER PUBLICATIONS

Csaba Stupák, "Filtering of the Color Images Distorted by Impulse Noise", Sep. 2001, Radioengineering, vol. 10, No. 3.*
Keshet et al. U.S. Appl. No. 10/743,623, filed Dec. 22, 2003.
Hel-Or U.S. Appl. No. 10/769,411, filed Jan. 31, 2004.

* cited by examiner

*Primary Examiner*—Jingge Wu
*Assistant Examiner*—Max Shikhman

(57) ABSTRACT

Denoising of a plurality of pixels of a color digital image includes analyzing the plurality of pixels to identify those pixels having a high likelihood of containing significant noise; and forcing those pixels having a high likelihood of containing significant noise to be photometrically coherent with nearby pixels having a lower likelihood of containing significant noise.

28 Claims, 6 Drawing Sheets

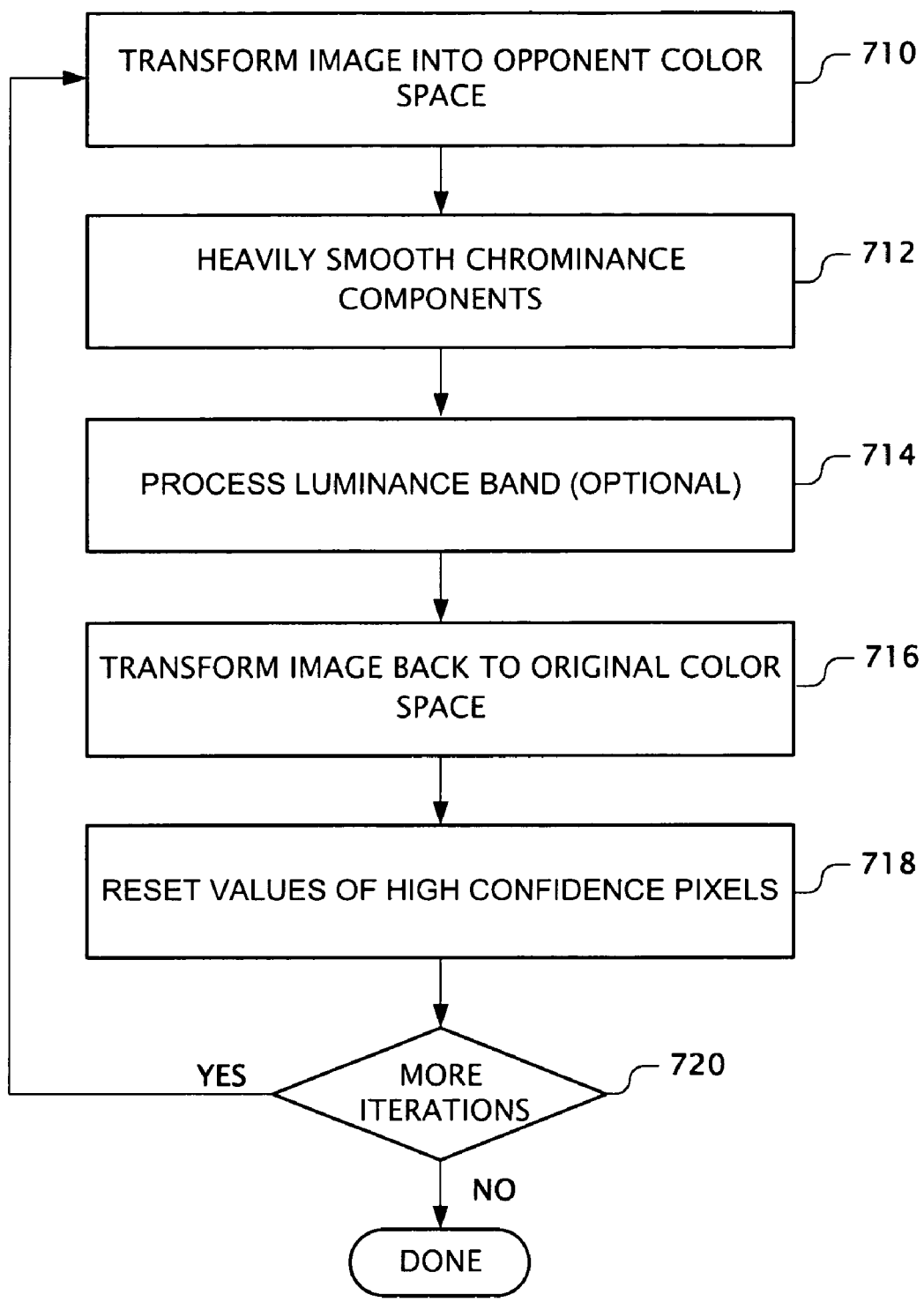

DIGITAL IMAGE DENOISING

BACKGROUND

Digital cameras use photosensor arrays to capture images. During image capture, an image is focused on a photosensor array, and individual photo-receptive elements of the array detect photons.

A high signal-to-noise ratio (SNR) is desirable. Sensor signal strength is proportional to the amount of detected photons. Sources of the noise include sensor shot noise and readout noise. Image quality can suffer from an extremely low SNR.

A weak sensor signal can result from underexposure during image capture (due to a lack of detected photons). Underexposure can occur due to poor lighting conditions, incorrect combinations of aperture and shutter speed, etc. Normally, noise in an underexposed image would not be visible because the details in the image are too dark to see. If contrast of the underexposed image is enhanced, however, the noise is amplified as a by-product of the contrast enhancement. As a result, the contrast-enhanced image has a very noisy appearance.

Sensor signal strength can be reduced by reducing the size of the photo-receptive elements. The current trend in digital cameras is to increase image resolution by reducing the size of the photo-receptive elements and increasing pixel count. Once, the common consumer-level camera had a two megapixel array. Now, the common consumer-level camera has a five megapixel array. Soon, the common consumer-level camera will have an eight megapixel array. Despite the higher image resolution, SNR is reduced dramatically.

Low SNR is also likely in images captured by inexpensive photosensor arrays. Inexpensive photosensor arrays and optics are becoming common in cellular phones and personal digital assistants (PDAs). These image capture systems are not intended to capture high quality images, but rather unplanned casual shots, often in poor lighting conditions.

It would be desirable to reduce image noise resulting from low SNR. It would be especially desirable to use a denoising algorithm that does not require a lot of memory and is not computationally intensive, so that the denoising algorithm could be incorporated into processing pipelines of commercial imaging devices (e.g., cameras, printers).

SUMMARY

According to one aspect of the present invention, denoising of a plurality of pixels of a color digital image includes analyzing the plurality of pixels to identify those pixels having a high likelihood of containing significant noise, and forcing those pixels having a high likelihood of containing significant noise to be photometrically coherent with nearby pixels having a lower likelihood of containing significant noise.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 7 is an illustration of a method of forcing photometric coherence in accordance with a second embodiment of the present invention.

DETAILED DESCRIPTION

Figure 1:
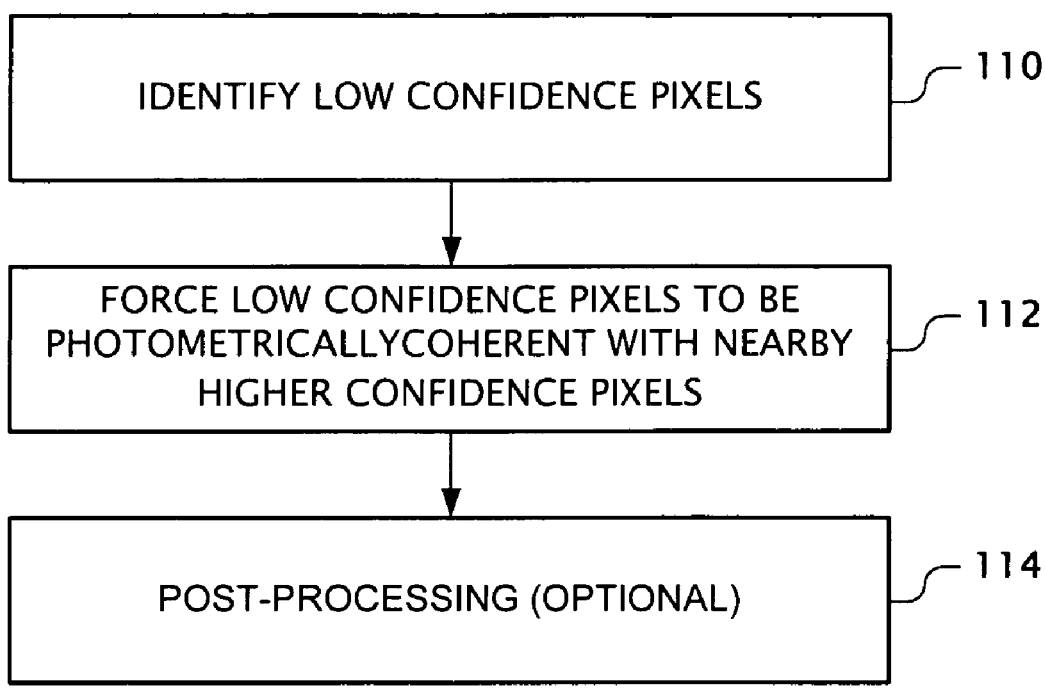
FIG. 1 is an illustration of a method of processing a color digital image in accordance with a first embodiment of the present invention.

As shown in the drawings for purposes of illustration, the present invention is embodied in digital image denoising. The denoising is especially effective on images having low signal-to-noise ratio. The denoising can be performed automatically and, therefore, doesn't require manual intervention. The denoising can be incorporated into the processing pipelines of digital cameras, printers and other commercial imaging products.

Reference is made to FIG. 1, which illustrates a method of denoising a plurality of pixels in a color digital image. Each pixel is represented by an n-bit word. The digital image may be fully sampled (i.e., an image having full color samples at each pixel) or the digital image may be undersampled (e.g., a mosaic image having only a single color sample at each pixel).

The denoising includes analyzing the plurality of pixels to identify those pixels having a high likelihood of containing significant noise (block 110). Those pixels identified as having a high likelihood of containing significant noise may be classified as "low confidence" pixels. Low confidence pixels are likely to be corrupted largely or entirely by noise. However, even pixels largely corrupted by noise might contain useful information. Therefore, the information contained in low confidence pixels will not be discarded.

A binary classification may be used. In a binary classification, pixels are classified as either low confidence pixels or "high confidence" pixels. Pixels are classified as high confidence pixels if they are not classified as low confidence pixels. In the alternative, a classification having more than two levels of confidence could be used, For example, multiple levels of confidence could be assigned by quantizing a continuous confidence level.

The denoising further includes forcing those pixels having a high likelihood of containing significant noise to be photometrically coherent with nearby pixels having a lower likelihood of containing significant noise (block 112). In general, when a low confidence pixel is forced to be photometrically coherent with its high confidence neighbors, each component of the low confidence pixel is made more similar to the corresponding component of the high confidence neighbors. For example, since it is known that chrominance does not change abruptly, the chrominance of the low confidence pixel could be forced to be similar to that of the high confidence neighbors. By forcing the low confidence pixel instead of interpolating a new value, information contained in low confidence pixels is not discarded. Examples of forcing photometric coherence will be provided below.

When a low confidence pixel is forced to be coherent with its high confidence neighbors, all of the color planes of that low confidence pixel may be forced together. By forcing all of the color planes together to be photometrically coherent, color consistency is increased (that is, fluctuations in color are reduced).

If a pixel doesn't have any high confidence neighbors, several options are available. As a first option, additional smoothing could be performed on low confidence pixels that have no high confidence neighbors. As a second option, the size of the neighborhood can be extended until high confidence pixels are found.

As a third option, the classification for high confidence pixels can be "relaxed" so that more pixels are classified as high confidence pixels. In a binary classification, for instance, the threshold could be relaxed so more pixels are classified as high confidence pixels. In a classification having more than two levels, a low confidence pixel could be forced to be photometrically coherent with neighboring pixels having an intermediate classification.

At block 114, post-processing may be performed. The post processing may include smoothing and edge sharpening to remove residual noise and enhance and retain edges. Certain filters can perform smoothing while preserving features such as edges. An example of such filtering is disclosed in U.S. Pat. No. 6,665,448. Other examples of filters that can smooth out smoother areas and enhance edges are Sigma and Wiener filters.

Figure 2:
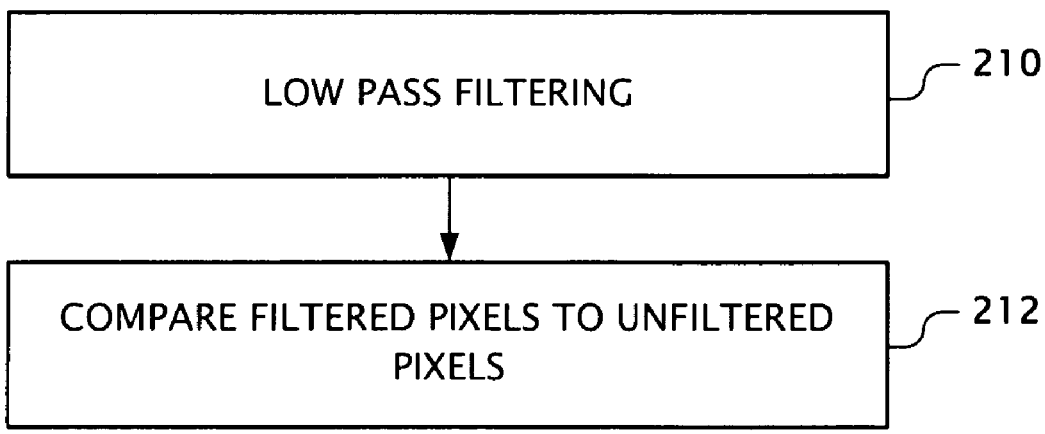
FIG. 2 is an illustration of a method of identifying high confidence pixels in accordance with a first embodiment of the present invention.

Reference is made to FIG. 2, which illustrates a first method of identifying pixels that are highly likely to contain significant noise. The first method involves thresholding a linear high pass filter. For example, the digital image is low-pass filtered (block 210), and the filtered pixels are compared to the unfiltered pixels (212). For example, those pixels that differ in the unfiltered and filtered images by no more than a small threshold value may be classified as low confidence pixels. Using a binary classification, the remaining pixels may be classified as high confidence pixels. The intuition behind this is that the pixels whose values are similar to those in the filtered image are the pixels that have low noise values. However, this first method does not discriminate noise from features such as edges.

Figure 3:
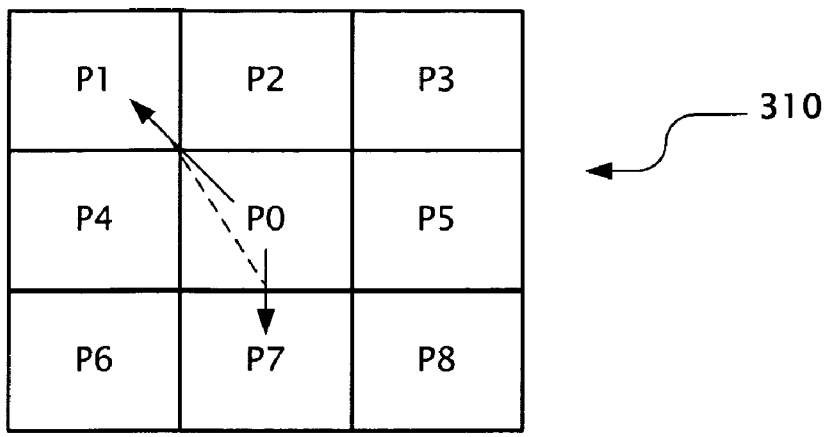
FIG. 3 is an illustration of a pixel neighborhood.
Figure 4:
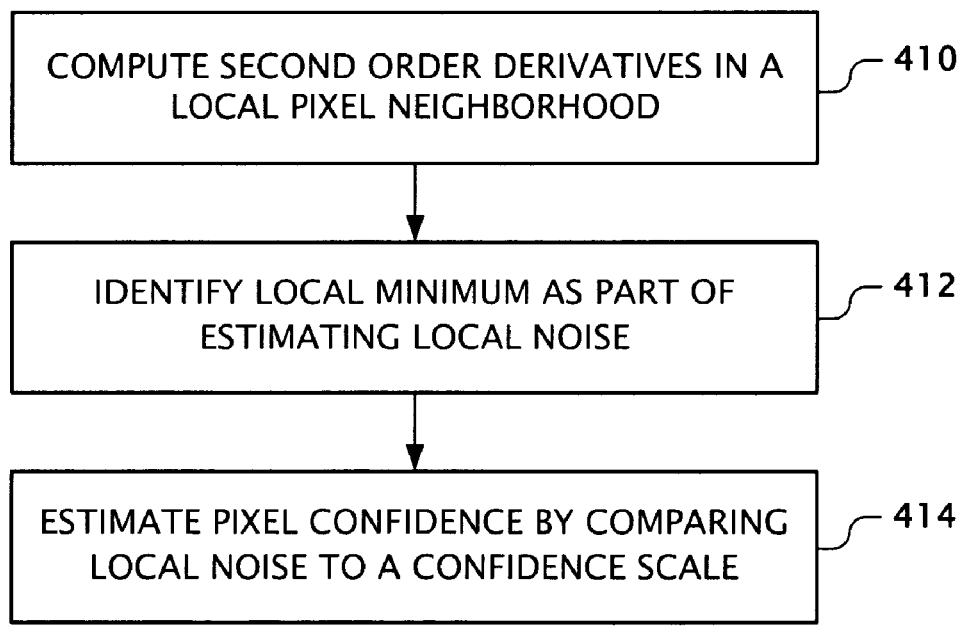
FIG. 4 is an illustration of a method of identifying high confidence pixels in accordance with a second embodiment of the present invention.

Reference is made to FIGS. 3 and 4, which illustrate a second method of identifying pixels that are likely to contain significant noise. The second method involves computing a set of second-order discrete-derivatives along a plurality of discrete curves that pass through the central pixel of each local pixel neighborhood 310. The pixels are processed one at a time.

FIG. 3 shows an exemplary 3×3 neighborhood 310. The pixel being processed is referred to as the central pixel P0, and the neighboring pixels located at relative position $r_n$ are referred to as pixels P1 to P8.

At block 410, the curved second-order derivatives are computed with respect to the central pixel P0. The curved second-order derivatives may be computed as follows. First order directional derivatives are computed for each neighbor. The first order derivative for a neighbor may be computed by dividing the difference between the central pixel and that neighbor by the Euclidean distance from the center to each of the neighbors, Thus, $D_n=(P_n-P0)/|r_n|$, where | | denotes absolute value. For example, in FIG. 3 the diagonal arrow between P1 and P0 represents $D_1$, while the vertical arrow represents $D_7$ A mid-point (½ $r_n$) for each these first derivatives is identified. From each pair first-order derivatives $D_n$, $D_m$, a corresponding curved second-derivative $DD_{nm}$ is computed by dividing the difference between the two derivatives, by the Euclidean distance between their respective representing points. Thus, $$DD_{nm}=(D_n-D_m)/|\tfrac{1}{2}r_n-\tfrac{1}{2}r_m|.$$

The dashed line in FIG. 3, corresponds to $DD_{1,7}$ and Its length corresponds to $|\tfrac{1}{2}r_1-\tfrac{1}{2}r_7|$.

At block 412, a local minimum is identified. The local minimum provides a measure of local noise. The local minimum may be computed as the minimum of absolute values of the curved second derivative $M=\min(|DD_{mn}|)$. For noise-free images, this noise measure has essentially zero response almost everywhere, including at edges and lines of any shape in piecewise-constant intensity profiles, and in straight edges and lines imposed on slowly-varying backgrounds. Therefore in images containing noise, any deviation of the pixel-noise measure from zero is likely to arise from noise (not signal), and high responses indicate with high-probability large noise values with magnitude comparable to the response.

At block 414, pixel confidence is estimated. The pixel-noise measure is evaluated relative to some signal or noise scale (a "confidence scale") in order to estimate the pixel confidence. Two examples of confidence scales will now be described: a parametric example and a non-parametric example.

In the parametric example, a confidence measure is a decreasing function of the ratio between the pixel-noise measure M and a confidence scale. The confidence scale is based on a noise parameter σ. For example the confidence scale may be taken as Gaussian function $C=\exp[-0.5*(M/\sigma)^2]$ In some instances the noise parameter σ may be estimated from system settings (such as exposure, ISO-setting etc. in digital cameras). In other instances, an auxiliary noise-level estimation algorithm may be selected from the many known in the general literature. See, for example, Bardos, A. J.; Sangwine, S. J., "Measuring noise in colour images", Non-Linear Signal and Image Processing (Ref. No. 1998/284), IEE Colloquium on, Vol., Iss., 22 May 1998, Pages: 8/1-8/4.

In the non-parametric example, the confidence scale does not rely on external noise estimation. Instead, the pixel-noise measure is compared to a neighborhood activity measure that is computed from the same set of local curved second-order derivative, e.g. the mean-absolute $\mu=\mathrm{mean}(|DD_{mn}|)$. In some embodiments, the confidence measure is $C=(\mu-M+\epsilon)/(\mu+M+\epsilon)$ where $\epsilon$ is a small regularization constant to avoid division by zero. The confidence values C are positive and not larger than 1. The highest confidence value, C=1, is obtained for vanishing noise-measure M=0 (regardless of the activity measure μ). On the other hand when the noise measure approaches the neighborhood activity measure μ−M<<μ,M, the confidence value approaches zero. This extreme case corresponds to an isolated speckle, i.e. a pixel with a very different value from its approximately constant valued neighborhood.

If a binary classification is desired, then the continuous confidence scale can be thresholded at some threshold between 0 and 1.

The pixel-noise and activity measures described above can be generalized to handle color images. The curved second derivatives are expressed as being proportional to the deviation of the central pixel P0 from a weighted average of neighbors $P_n$, $P_m$ ($P_{nm}$). Thus, $DD_{nm}=A_{nm}*(P_{nm}-P_0)$, where $P_{nm}=W_{nm}*P_n+(1-w_{nm})*P_m$ with the weight of $P_n$ being $W_{nm}=|r_m|/(|r_n|+|r_m|)$, and with the proportionality constant $A_{nm}=2*(|r_n|+|r_m|)/(|r_n+r_m|*|r_n|*|r_m|)$. The absolute values of the curved second derivatives $|DD_{nm}|=A_{nm}*|P_{nm}-P_0|$, can be expressed in a more general form through a distance-metric between the pair average $P_{nm}$ and the central pixel $P_0$ as $||DD_{nm}||=A_{nm}* \delta(P_{nm},P_0)$, where $\delta$ is a distance function between its two arguments. The original formula corresponds to $\delta(x1, x2)=|x1-x2|$. In the case of RGB color images, both arguments $P_{nm},P_0$ are three-component vectors in some colorspace, and the following color distance metric may be used: $\delta(P_{nm},P_0)=([R(P_{nm})-R(P_0)]^2+[G(P_{nm})-G(P_0)]^2+[B(P_{nm})-B(P_0)]^2)^{1/2}$. Other, more perceptual color-distance metrics may be used, corresponding to color spaces such as YCC or CIELab.

The method of FIGS. 3-4 identifies pixels likely to contain significant noise, but in a manner that is resilient to features in the image. Contrast this to edge-preserving filters and other edge-detecting filters, which are resilient to noise.

Figure 5:
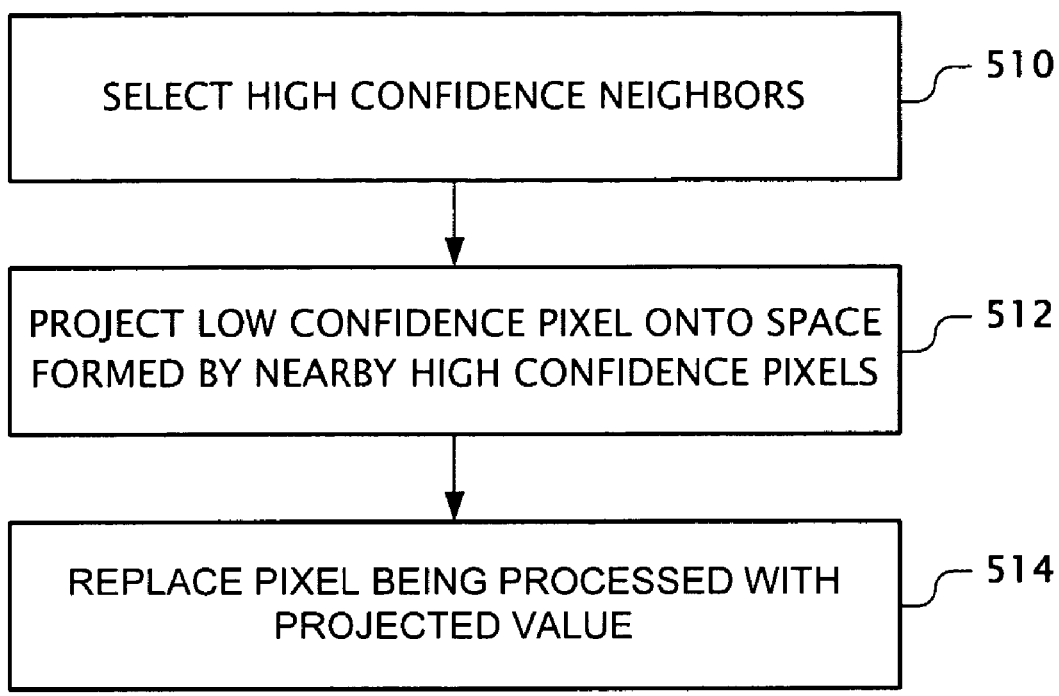
FIG. 5 is an illustration of a method of forcing photometric coherence in accordance with a first embodiment of the present invention.

Reference is made to FIG. 5, which illustrates a first method of forcing a pixel in the color image to be photometrically coherent with nearby high confidence pixels. It has been observed that when intensity values for a local area are plotted in RGB or YUV space, they typically form a cluster with an ellipsoid shape. Sometimes, two or more clusters are formed. While most of the pixels fall within these two clusters, some pixels fall on a line connecting the centers of these two clusters. The first method uses this observation in that high confidence pixels are used to form "good" space, and the low confidence pixels are projected onto the good space.

As shown in FIG. 5, a pixel may be processed as follows. At block 510, nearby high confidence pixels are selected. The selected pixels have the closest photometric distance to the pixel being processed The distance (d) between a nearby pixel (x1, y1) and the pixel being processed (x2, y2) may be computed as $$d=[R(x1,y1)-R(x2,y2)]^2+[G(x1,y1)-G(x2,y2)]^2+[B(x1,y1)-B(x2,y2)]^2$$

where R( ), G( ) and B( ) are the red, green and blue intensity values of a pixel.

In the alternative, the selected pixels have the closest weighted photometric and geometric distance to the pixel being processed The distance (d) between a nearby pixel (x1,y1) and the pixel being processed (x2,y2) may be computed as $$d=[R(x1,y1)-R(x2,y2)]^2+[G(x1,y1)-G(x2,y2)]^2+[B(x1,y1)-B(x2,y2)]^2+\gamma[(x1-x2)^2+(y1-y2)^2]$$

where $\gamma$ is a factor that decides a weighting ratio between the photometric and geometric distance. The photometric distance may be given a greater weight $\gamma$ for a higher SNR.

Figure 6A:
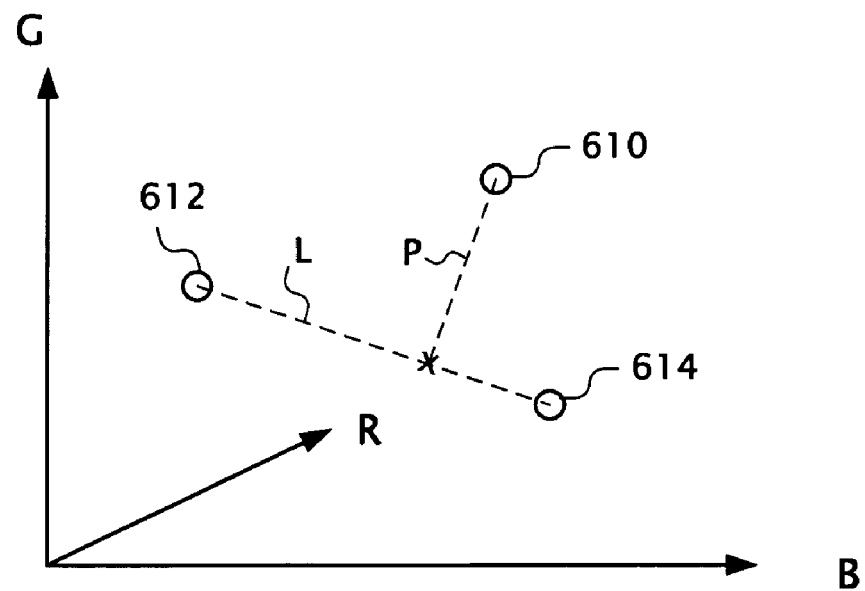
FIGS. 6a and 6b are illustrations of pixel projections onto a space formed by high confidence pixels.
Figure 6B:
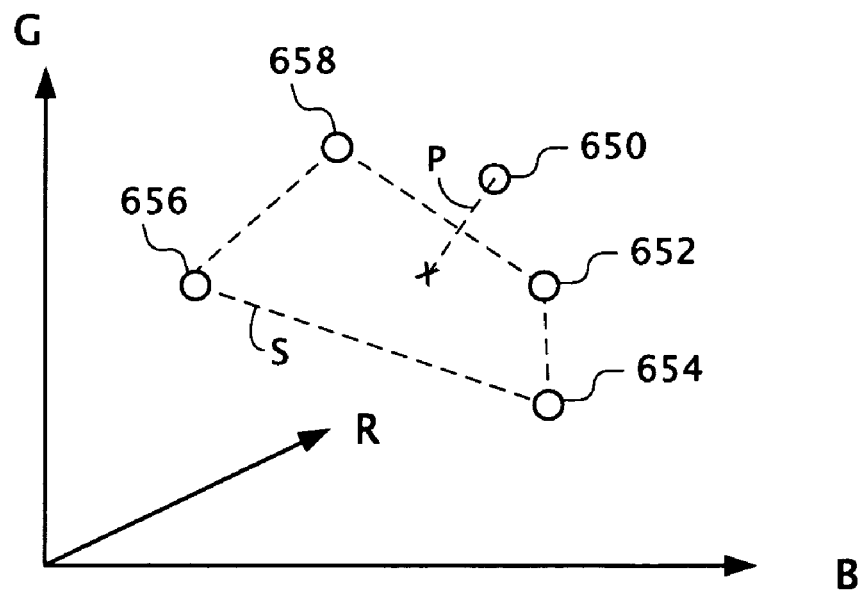

At block 512, the pixel being processed is projected onto a space formed by the selected high confidence pixels. Two examples of projecting the pixel are illustrated in FIGS. 6a and 6b Reference is now made to FIG. 6a. As a first example, the pixel being processed 610 is projected onto a line L between the two selected high confidence pixels 612 and 614. In this example, the pixels 610-614 are plotted in RGB space, and the projection (P) is orthogonal to the line L. The projected value is denoted by an "x."

Reference is now made to FIG. 6b. As a second example, the pixel being processed 650 is projected onto a surface S, which is defined by four selected pixels 652, 654, 656, 658. In this example, the pixels 650-658 are also plotted in RGB space, and the projected value (denoted by "x") may be found by finding a line P that is orthogonal to the surface S and passes through the pixel being processed 650. In the alternative, the projected value may be the value on the surface S that is closest to the pixel being processed 650.

Reference is once again made to FIG. 5. At block 514, the value of the pixel being processed is replaced by the projected value. Additional iterations could be performed to improve upon the projected value.

Solutions other than projecting the low confidence pixel onto a line or surface may be used. Other solutions may include, but are not limited to, Principle Component Analysis (PCA), or a solution that minimizes a joint probability. However, the projection method has a lower computational complexity because simple projections are performed, and the method is robust because it does not try to solve ill-posed problems (which may be very sensitive).

Reference is made to FIG. 7, which illustrates a second embodiment of forcing low confidence pixels to be photometrically coherent with nearby high confidence pixels. The approach of FIG. 7 is based on the observation that when the derivative of the intensity values for a local area are plotted onto RGB space, they exhibit a tight linear correlation.

The digital image is transformed from RGB color space into an opponent color space (block 710). Any opponent space may be used. Examples of opponent space include, without limitation, (I,c1,c2), YIQ, YCbCr, HSV, and CIE-LAB.

Chrominance components of the transformed output image are heavily smoothed (block 712), since most of the noise is in the chrominance channels. In terms of frequencies, light smoothing would be less aggressive in reducing high frequencies of an image, as compared to the strong smoothing. The smoothing may be isotropic or anisotropic. Natural images are expected to be smooth in chrominance bands, whereas high frequencies are more probable in the luminance band. The chrominance channels may be smoothed with a low pass filter such as Laplacian kernels Gaussian kernels, bilateral filtering, etc. Chrominance is filtered more aggressively (without too much penalty) since chrominance is typically "smoother" than luminance.

The luminance band may be lightly smoothed, left unchanged or even slightly sharpened (block 714). The smoothing may include directional or anisotropic smoothing in the luminance component. Anisotropic smoothing is context dependent, such that pixel values appearing across an edge are lightly weighted in the estimation. An advantage of such smoothing is that edges are preserved. An edge-preserving lowpass filter such as a bilateral filter may be used to smooth the luminance channel.

The relative smoothing of the chrominance to luminance may be expressed as a ratio $\alpha/\beta$, where $\alpha$ and $\beta$ come from statistical models of the image, and where $\alpha$ represents the smoothing of the chrominance and $\beta$ represents the smoothing of the luminance. An exemplary ratio is $\alpha/\beta=24$.

The output image is transformed back to its original color space (block 716). For example, the smoothed image is transformed back to RGB color space.

Values of certain pixels in the transformed image are reset (block 718). In the transformed image, the values of the high confidence pixels are reset to their values prior to smoothing (that is, prior to step 712). For example, the transformed image has pixel values m(i,j), where i and j are indices to the rows and columns of transformed image. Values of high confidence pixels of the image are denoted as a(i,j). If a high confidence pixel at the fourth row and fourth column has a value a(4,4), the transformed image is reset as m(4,4)=a(4,4).

The processing at blocks 710-718 may be repeated over several iterations (block 720). The processing may stop upon converging to an optimal result, or when the result is "close enough" to the optimum. For example, the processing can be stopped when the improvement (e.g., Euclidean distance between successive iterations) becomes smaller than a threshold. Alternatively, the processing can be stopped after a fixed number of iterations. The fixed number would typically bring the output close enough to the optimum.

Post-processing may be performed after the last iteration. For example, bilateral filtering may be performed to reduce the visibility of residual noise, while preserving edges.

If all steps are linear, a fixed number of iterations can be concatenated into a single linear operation. From this single linear operation, a set of linear convolution kernels can be generated.

Figure 8:
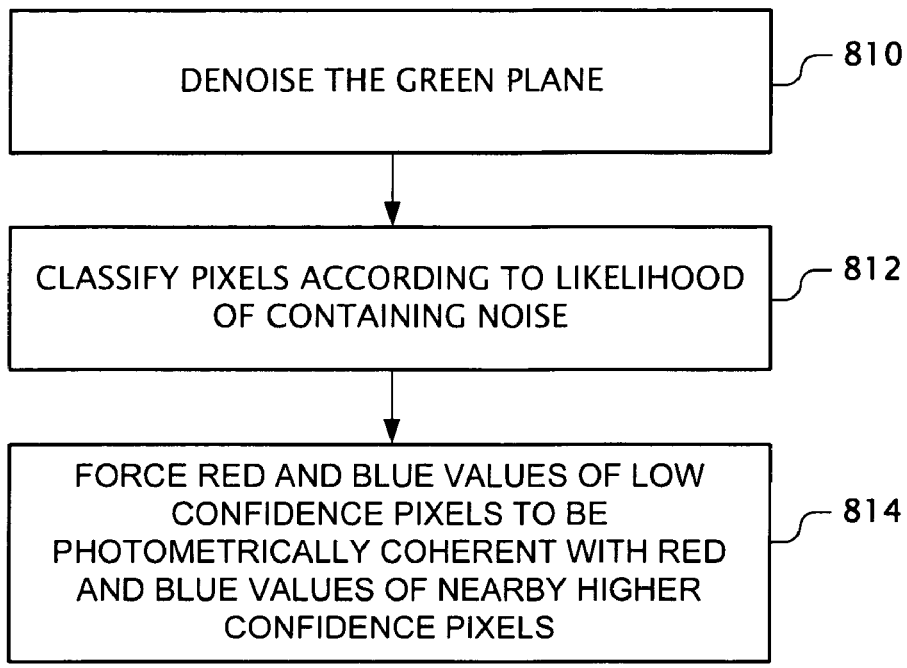
FIG. 8 is an illustration of a method of processing a color digital image in accordance with a second embodiment of the present invention.

Reference is now made to FIG. 8, which shows another method of denoising a color digital image. The digital image is processed in RGB color space. Pixels are classified according to their likelihood of containing noise (block 812).

Prior to forcing photometric coherence, however, the green color plane is denoised (block 810). For example, the denoising could be performed by transform-based filtering, bilateral filtering etc. Filtering that does not blur edges, such as bilateral filtering, is preferred All values in the smoothed green plane are considered high confidence values At block 814, the red and blue values of low confidence pixels are forced to be photometrically coherent with the red and blue values of nearby higher confidence pixels (the denoised green values are not modified, since they are considered high confidence). The projection method of FIG. 5 or the parametric method of FIG. 7 may be used to force the red and blue values.

Figure 9:
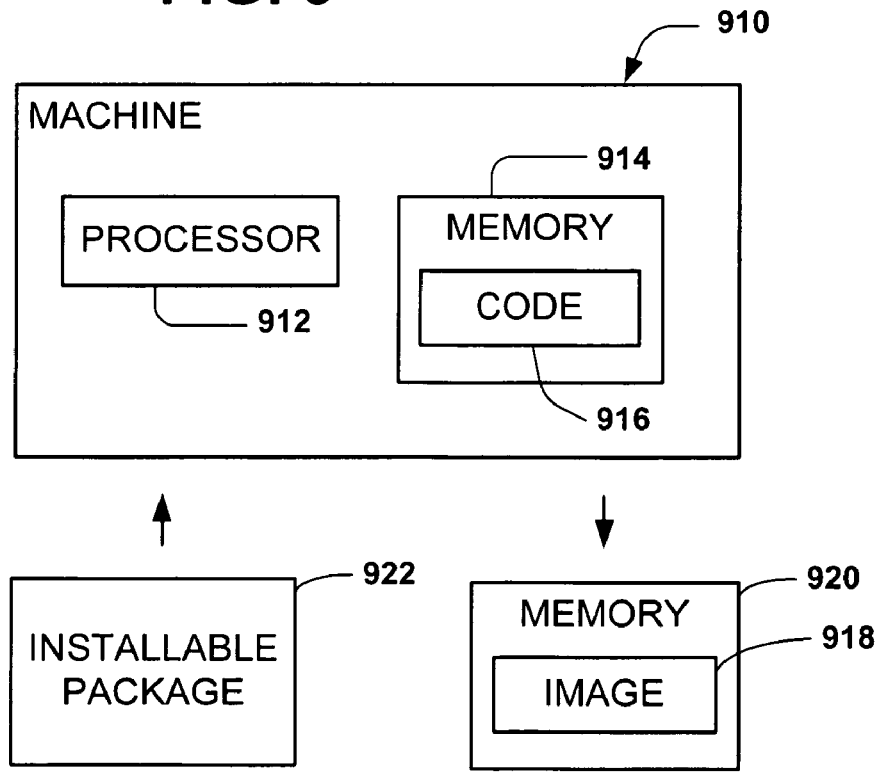
FIG. 9 is an illustration of a system in accordance with an embodiment of the present invention.

Reference is now made to FIG. 9, which illustrates a machine 910 for reducing noise in a digital image. The machine 910 includes a processor 912 and memory 914. The memory 914 stores code 916 for causing the processor 912 to reduce noise in accordance with the present invention.

In some embodiments, the machine 910 may be a computer. For a computer, the processor 912 is a general purpose processor. The computer can display the processed image 918 on a video display, send the processed image 918 to another machine (e.g., a server for storage, a display device for display), store the processed image 918 on a removable medium 920, etc.

The code 916 could be a standalone program, or it could be part of a larger program (e.g., an image editing program). The code 916 can be distributed to the computer in a variety of ways. For example, the code 916 could be distributed as an installable package, a browser plug-in, etc. The code can be distributed via removable memory 922 (e.g., a DVD, a CD), a network, etc.

In some embodiments, the machine 910 may be an imaging device such as a printer. For a printer, the processor 912 and the memory 914 may be part of a dedicated processor (e.g., an ASIC, a DSP). The imaging device accesses raw images from a capture device (e.g., downloads images from memory of a digital camera), reduces noise in accordance with the present invention, and sends the processed images to its imaging engine. A printer, for example, would process the images and send the processed images to its print engine.

In some embodiments, the machine 910 may be a digital camera. For a digital camera, the processor 912 and the memory 914 may be part of a dedicated processor (e.g., an ASIC, a DSP). A processing pipeline of the processor 912 could include demosaicing and compression, The processing pipeline could also include denoising according to the present invention. The denoising is more robust to noise introduced by the demosaicing and compression.

Denoising according to the present invention can be performed automatically. Input parameters can be estimated (e.g., during manufacture, based on a large number of test images), and the denoising could be performed with these estimated parameters. In the alternative or in addition, the input parameters could be user-adjusted. Examples of input parameters include thresholds for pixel classifications, values for gamma, neighborhood (block) size, and values for alpha and beta. Unlike some conventional approaches, there is no need for manual intervention such as choosing smooth areas to estimate noise characteristics, or selecting an amount of filtering for specific frequency ranges.

Although several specific embodiments of the present invention have been described and illustrated, the present invention is not limited to the specific forms or arrangements of parts so described and illustrated. Instead, the present invention is construed according to the following claims.

The invention claimed is:

1. A method of denoising a plurality of pixels in a color digital image, the method comprising using a processor to perform the steps of:

analyzing the plurality of pixels to identify those pixels having a high likelihood of containing significant noise;

for each pixel having a high likelihood of containing significant noise, selecting nearby pixels having a lower likelihood of containing significant noise; and forcing each pixel having a high likelihood of containing significant noise to be photometrically coherent with the selected nearby pixels for that pixel having a lower likelihood of containing significant noise, wherein the forcing of each pixel comprises one of replacing each such pixel with its projection onto a line between two of the nearby pixels and replacing each such pixel with its projection onto a surface defined by at least three of the nearby pixels.

2. The method of claim 1, wherein those pixels having a low likelihood of containing significant noise are not modified.

3. The method of claim 1, wherein analyzing the plurality of pixels includes thresholding a linear high pass filter.

4. The method of claim 1, wherein analyzing the plurality of pixels includes, for each pixel, computing second order derivatives with respect to neighboring pixels; identifying a local absolute minimum among the second order derivatives; and using the local absolute minimum to estimate pixel confidence.

5. The method of claim 1, wherein the pixels forming the line or the surface have the closest photometric and geometric distance among the nearby pixels.

6. The method of claim 5, wherein the photometric and geometric distance is weighted.

7. The method of claim 1, wherein forcing the pixels includes replacing the pixels with parametric representations.

8. The method of claim 7, wherein replacing the pixels with parametric representations includes transforming the image to luminance-chrominance space; smoothing the chrominance channel more heavily than the luminance channel; transforming the smoothed image back to the image's original color space; and resetting values of pixels in the transformed image to the values of the corresponding pixels that have a low likelihood of containing significant noise.

9. The method of claim 8, wherein an edge-preserving lowpass filter is used to smooth the luminance channel.

10. The method of claim 8, wherein the image transformations, and the smoothing and resetting operations are linear operations, and wherein these linear operations are concatenated into a single operation.

11. The method of claim 1, wherein a green plane of the image is denoised prior to identifying those pixels having a high likelihood of containing significant noise; and wherein red and blue values of those pixels having a high likelihood of containing significant noise are forced to be photometrically coherent.

12. The method of claim 1, farther comprising removing residual noise after forcing those pixels to be photometrically coherent.

13. The method of claim 1, wherein all color components of a pixel are forced together.

14. A system comprising a processor for denoising color digital images according to the method of claim 1.

15. An article for a processor, the article comprising memory encoded with code for causing the processor to perform the method of claim 1.

16. Apparatus for denoising a plurality of pixels in a color digital image, the apparatus comprising:
   means for analyzing the plurality of pixels to identify those pixels having a high likelihood of containing significant noise;
   means for selecting, for each pixel having a high likelihood of containing significant noise, nearby pixels having a lower likelihood of containing significant noise; and
   means for forcing each pixel having a high likelihood of containing significant noise to be photometrically coherent with the selected nearby pixels for that pixel having a lower likelihood of containing significant noise, wherein the forcing of each pixel comprises one of replacing each such pixel with its projection onto a line between two of the nearby pixels and replacing each such pixel with its projection onto a surface defined by at least three of the nearby pixels.

17. Apparatus for denoising a plurality of pixels in a color digital image, the apparatus comprising a processor for analyzing the plurality of pixels to identify those pixels having a high likelihood of containing significant noise, selecting for each pixel having a high likelihood of containing significant noise nearby pixels having a lower likelihood of containing significant noise, and forcing each pixel having a high likelihood of containing significant noise to be photometrically coherent with the selected nearby pixels for that pixel having a lower likelihood of containing significant noise, wherein the forcing of each pixel comprising one of replacing each such pixel with its projection onto a line between two of the nearby pixels and replacing each such pixel with its projection onto a surface defined by at least three of the nearby pixels.

18. The apparatus of claim 17, wherein analyzing the plurality of pixels includes low-pass filtering the plurality of pixels; and identifying those filtered pixels that differ from the unfiltered pixels by no more than a small threshold value.

19. The apparatus of claim 17, wherein analyzing the plurality of pixels includes, for each pixel, computing second order derivatives with respect to neighboring pixels; identifying a local absolute minimum among the second order derivatives; and using the local absolute minimum to estimate pixel confidence.

20. The apparatus of claim 17, wherein forcing the pixels includes replacing the pixels with parametric representations.

21. The apparatus of claim 20, wherein replacing the pixels with parametric representations includes transforming the image to luminance-chrominance space; smoothing the chrominance channel more heavily than the luminance channel; transforming the smoothed image back to the image's original color space; and resetting values of pixels in the transformed image to the values of the corresponding pixels that have a low likelihood of containing significant noise.

22. The apparatus of claim 17, wherein a green plane of the image is denoised prior to identifying those pixels having a high likelihood of containing significant noise; and wherein red and blue values are forced to be photometrically coherent.

23. The apparatus of claim 17, wherein all color components of a pixel are forced together.

24. The apparatus of claim 17, further comprising a print engine.

25. The apparatus of claim 17, further comprising a photosensor array.

26. An article comprising memory encoded with image denoising instructions for causing a machine to analyze a plurality of pixels to identify those pixels having a high likelihood of containing significant noise, to select for each pixel having a high likelihood of containing significant noise nearby pixels having a lower likelihood of containing significant noise, and to force each pixel having a high likelihood of containing significant noise to be photometrically coherent with the selected nearby pixels for that pixel having a lower likelihood of containing significant noise, wherein the forcing of each pixel comprises one of replacing each such pixel with its projection onto a line between two of the nearby pixels and replacing each such with its projection onto a surface defined by at least three of the nearby pixels.

27. A method of denoising a plurality of pixels in a color digital image, the method comprising using a processor to perform the steps of:
   analyzing the plurality of pixels to identify those pixels having a high likelihood of containing significant noise; and
   forcing those pixels having a high likelihood of containing significant noise to be photometrically coherent with nearby pixels having a lower likelihood of containing significant noise, wherein forcing a pixel includes replacing its pixel value with its projection onto a space formed by at least two nearby pixels that are less likely to contain significant noise, and wherein the pixels forming the space have the closest photometric and geometric distance among the nearby pixels.

28. The method of claim 27, wherein the photometric and geometric distance is weighted.

* * * * *

UNITED STATES PATENT AND TRADEMARK OFFICE
CERTIFICATE OF CORRECTION

PATENT NO. : 7,522,782 B2
APPLICATION NO. : 11/099794
DATED : April 21, 2009
INVENTOR(S) : Suk Hwan Lim et al.

It is certified that error appears in the above-identified patent and that said Letters Patent is hereby corrected as shown below:

In column 9, line 7, in Claim 12, delete "farther" and insert -- further --, therefor.

In column 9, line 45, in Claim 17, delete "comprising" and insert -- comprises --, therefor.

In column 10, line 36, in Claim 26, after "such" insert -- pixel --.

Signed and Sealed this

Seventeenth Day of November, 2009

David J. Kappos
*Director of the United States Patent and Trademark Office*